March 30, 1937.  H. NEHLSEN  2,075,622

EXTRUSION PRESS WITH ELECTRICALLY HEATED CONTAINER

Filed Oct. 11, 1935  2 Sheets-Sheet 1

INVENTOR
Hermann Nehlsen
BY
his ATTORNEY

March 30, 1937.    H. NEHLSEN    2,075,622

EXTRUSION PRESS WITH ELECTRICALLY HEATED CONTAINER

Filed Oct. 11, 1935    2 Sheets-Sheet 2

INVENTOR
Hermann Nehlsen
BY
his ATTORNEY

Patented Mar. 30, 1937

2,075,622

UNITED STATES PATENT OFFICE 2,075,622

EXTRUSION PRESS WITH ELECTRICALLY HEATED CONTAINER

Hermann Nehlsen, Meererbusch, near Dusseldorf, Germany, assignor to Schloemann Aktiengesellschaft, Dusseldorf, Germany, a corporation of Germany Application October 11, 1935, Serial No. 44,543
In Germany February 15, 1932

7 Claims. (Cl. 219—47)

My invention relates to method and apparatus for heating containers of extrusion presses.

The containers of extrusion presses have to be heated before the extrusion process is commenced lest the inserted billets are cooled off at the walls of the container bore. Various means have been provided to effect this.

A comparatively simple method is to heat the container bore by means of the inserted billets which are eventually to be extruded. This method requires much time and is cumbersome, and, therefore, uneconomical. For this reason, special heating apparatuses have been provided for the containers of extrusion presses. Gas, oil or resistance heaters have been applied. All these heating methods may be collectively termed as radiation heating, for most of the heat is projected by radiation from the heating apparatus to the surface of the container.

This radiation heating has the drawback that the container is non-uniformly heated so that thermal tensions occur. This, in connection with the extraordinary mechanical stresses to which the container is exposed during the extrusion process, leads to cracking. The danger of cracking might be somewhat decreased by slow heating. However, this would mean an extended interruption of the operation of the press.

Furthermore, the container consists generally of several sleeves shrunk together. If a container warms up non-uniformly, the shrinking tension will be dissipated. Consequently, the inner sleeves (liners) are loosened and their capacity of conducting heat is consequently decreased. Also, loose liners are liable to crack easily during the operation of the press.

Besides, each heating apparatus can only radiate a limited amount of heating, depending on its surface. Therefore, a predetermined heating capacity requires a certain minimum radiating surface. Any attempt to increase the heating capacity by enlarging the radiating surface is thus checked by the limited space within the container.

The object of my invention is to provide an extrusion press with an electrically heated container without the above shortcomings.

The primary characteristic of my invention is a coil disposed co-axially with respect to the container bore and energized by alternating current of low frequency, which coil produces induction currents within the container, thereby heating it. In this manner, the heat is produced in the container body itself instead of being projected by radiation. Thus, all points of the container are heated to the same temperature and are kept uniformly heated, which eliminates the possibility of thermal stresses caused by differences of temperature. This way of heating also increases the life of the container. An additional advantage of my invention is that alternating current of common frequency can be used for the coil. Frequency transformers which are costly and undependable in operation are avoided, economy and reliability of this new heater being thereby increased.

I shall now describe my invention in detail, referring to the accompanying drawings which represent, by way of example, three embodiments of my invention:

Figure 1:
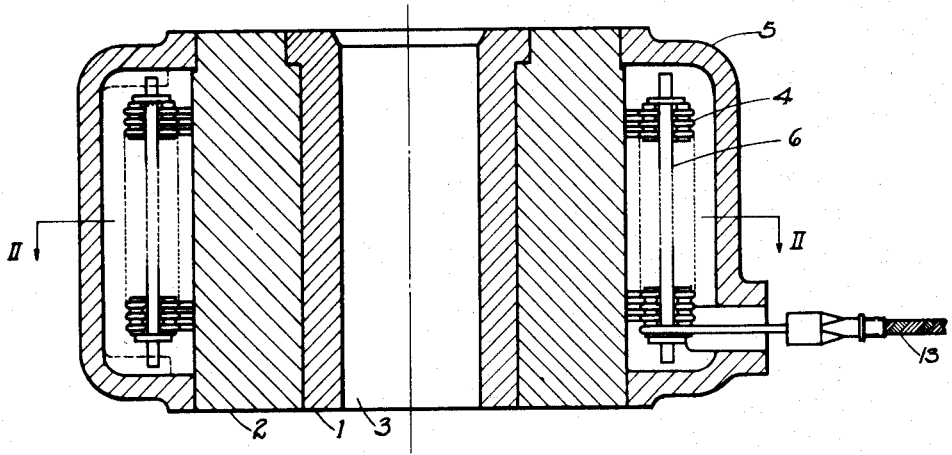
Figure 1 shows a longitudinal section of one embodiment of the invention.

Figure 1 shows an extrusion press container of the most common design, consisting of the inner liner 1 and the outer liner 2 shrunk together. It is advisable to make these liners from a steel of great mechanical strength and high magnetic conductivity. Coaxially with the axis of the container bore 3, a coil 4 (Fig. 2) is provided to which is fed from the outside alternating current of common frequency. The coil is surrounded by a jacket 5 so that it is lodged in a chamber closed on all sides. Jacket 5 may be connected with the other parts of the press by any well known means. If the container is to be replaced, it is only necessary to remove the liners 1 and 2 while the coil 4 with the cover 5 may remain attached to the press.

The liners 1 and 2 of the container, together with jacket 5, form a closed magnetic circuit. If the coil 4 is energized by alternating current of common frequency, induction current will be produced in said magnetic circuit so as to cause uniform heating. This is a very swift process which reduces the heating period considerably as compared with radiation heating.

The temperature of the container may be easily controlled either by a regulation of the time of energizing the coil or by a regulation of the amount of current.

Figure 2:
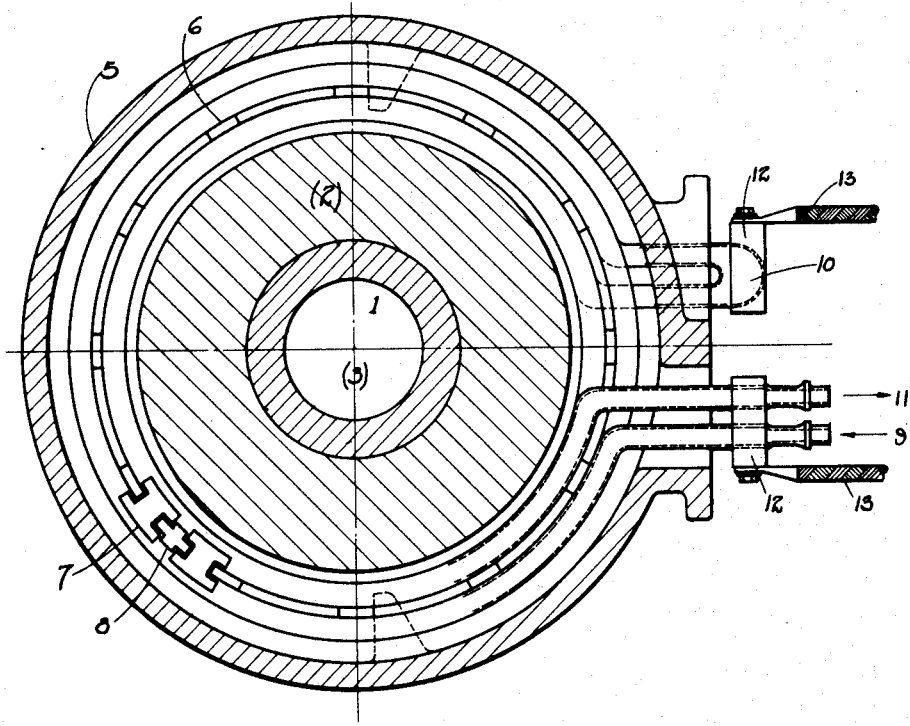
Figure 2 shows an axial section along line II to II of Figure 1.

In the embodiment shown in Figures 1 and 2, the coil 4 consists of two layers of flattened copper tubes held together by flat rails 6 mounted parallel to the axes of the container bore and the coil. The rails 6 are located between the two layers of the coil, thus being protected against the heat which radiates from the heated container. They may, therefore, be covered with a mica insulation without being caused to become dry and brittle. Between the individual windings of the coil there are provided spacers 7 made from insulating material, e. g. asbestos sheets, which are mounted on the rails 6. For this purpose the spacers 7 have notches at the radial sides which embrace the rails. The individual windings of the coil are fastened in radial direction by means of metal segments 8 which are mounted between the windings. One metal segment always alternates with one spacer 7. The spacers 7 have also notches at their radial surfaces which engage the metal segments 8, the latter being inserted into said notches by means of protruding heads.

It is necessary to cool the coil 4 in order to protect it against the heat which is radiated by the surrounding parts 2 and 5. To this end, water or another cooling medium is circulated through the hollow windings of the coil. The water enters at 9 (Fig. 2) in the outer layer of the coil, flows through all the windings of this layer, and, at the other end of the coil, is directed to the inner layer by way of a bent part 10. The water flows then through all the windings of the second layer and is finally discharged at 11. While the cooling water passes through the two layers of the coil consecutively, these layers are electrically connected in parallel. This is effected by both ends of the coil being joined by clamps 12, to which the terminals 13 are connected (Fig. 2). In this fashion the same electrical potential is attained both at the inlet and the outlet of the water. Hence it is possible to bring both water connections to the potential zero through ground, thus keeping an increased potential off the outside line of the cooling water.

For further cooling, the coil may also be covered with a reflecting layer, for instance chromium, which will reflect the heat radiated by the surrounding of the coil.

In the embodiment of my invention as shown in Figures 1 and 2, the magnetic circuit of the coil 4 comprises also the jacket 5 so that induction currents are produced therein as well. The jacket being made from a solid steel casting for the sake of rigidity, these induction currents are quite powerful and generate considerable heat. Since no heat is desired on the outside of the container, the energy required for that purpose is to be regarded as wasted.

Figure 3:
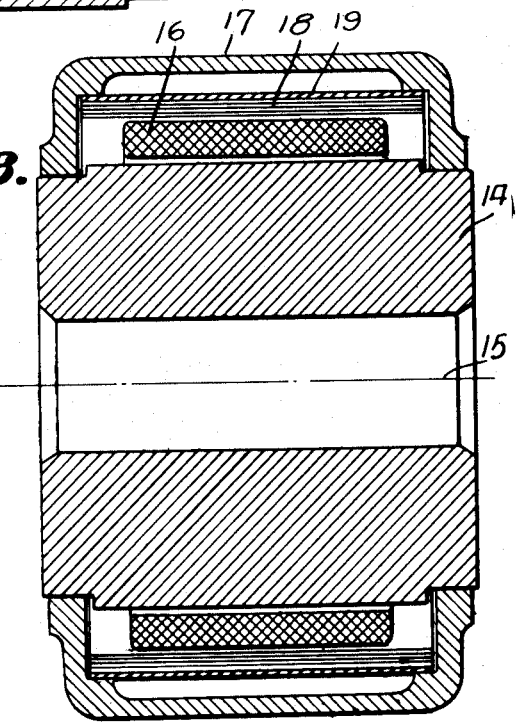
Figure 3 is a longitudinal section of another embodiment of the invention.

Figure 3 shows an embodiment of my invention where provisions are made to keep the magnetic flux off the jacket. In this case, the container consists of a single liner 14 having the bore 15, the coil 16 mounted parallel to said bore and which in all other respects is similar to the coil shown in Figures 1 and 2, and the solid jacket 17. Between coil 16 and jacket 17 sheets 18 of magnetic material, so called dynamo or transformer sheets are provided. They are piled parallel to the circumference of the coil and the jacket. The magnetic flux which is produced by the coil 16 can by-pass the jacket 17. The sheets 18 need not extend round the whole circumference of the coil. It is sufficient to use a certain amount of sheet packs in the shape of segments, which provide a path of sufficient cross-section for the magnetic flux. As a further protection of jacket 17 against the magnetic flux, a sleeve 19 is inserted between the sheet packs and the jacket, which sleeve is made of conductive material, acting as a short-circuit coil and is an additional safeguard against the intrusion of the magnetic flux into the jacket.

The embodiment of my invention shown in Figure 3 may of course, also be applied to such containers which consist of several liners shrunk together as shown in Figures 1 and 2.

Figure 4:
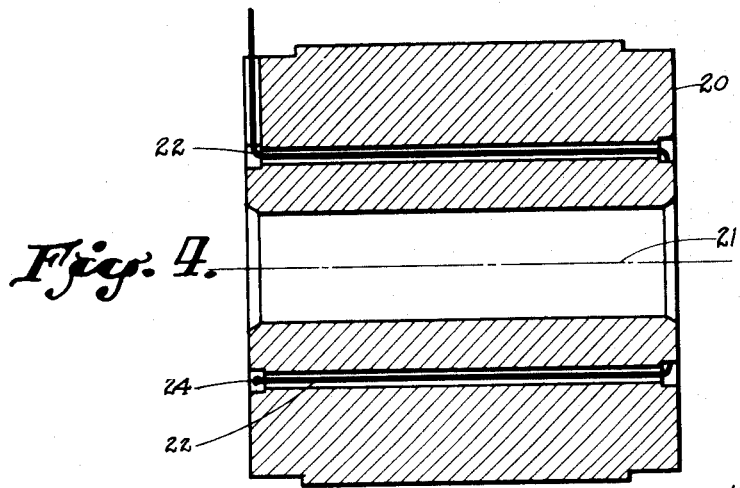
Figure 4 shows a longitudinal section of a third embodiment of the invention.
Figure 5:
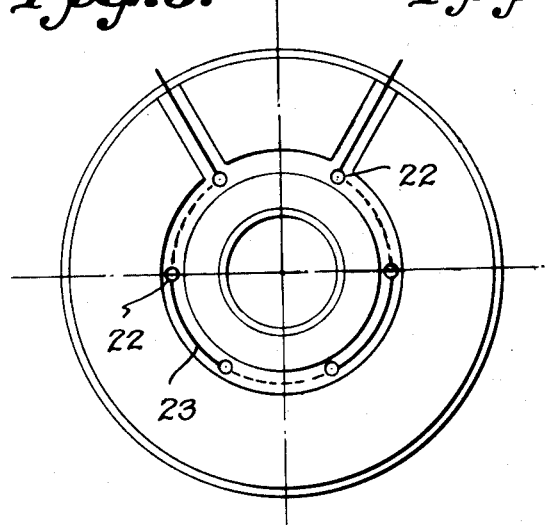
Figure 5 is a front view of the embodiment as shown in Figure 4.

Figure 4 shows a third embodiment of my invention where the container is also made of one piece 20 having the bore 21. For the sake of simplicity the container jacket is not shown here. Contrary to the above-described embodiments of my invention, the conductors of the coil which produce the induction currents in the container, are located in the container body proper. They consist of rods 22 mounted parallel to the axis of bore 21 and are joined alternatively at opposite ends of the container by means of cross connections 23 (Fig. 5). These end joints are embedded in grooves 24 of the container so as not to protrude.

With this embodiment of the invention, the conductors are particularly close to the container bore and thereby to that part, the heating of which is of primary interest. Consequently, the magnetic force in the neighborhood of container bore 21 is even stronger than with the embodiment of the invention where the coil is outside of the container. It follows that the walls of the bore are heated quicker and more intensely, which improves the efficiency of the heating system. A further advantage of locating the heating in the container body itself is the possibility of heating the container before inserting it into the press.

Figure 6:
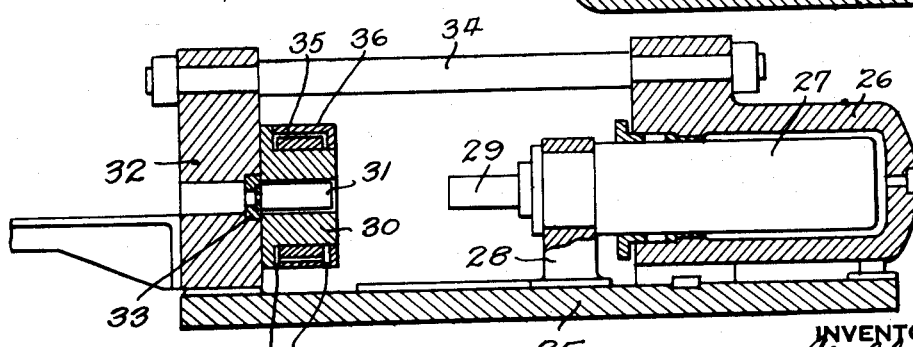
Figure 6 is a diagrammatic view of an extrusion press equipped with a heating coil for heating the billet container, in accordance with the present invention.

Figure 6 is a diagrammatic view of an extrusion press which is equipped with a heating coil for heating the billet-container. In said figure, there is shown at 25 a base plate on which is mounted the hydraulic cylinder 26, in which is movably disposed the plunger 27, which is guided by the travelling guide 28 supported on the base plate 25. At its projecting forward end, the plunger carries the mandrel 29. Opposite thereto and in alignment therewith is provided the billet container shown at 30, the inner bore of which is designed to receive the hot billet, shown at 31. The billet container is attached to the abutting holder shown at 32, which has mounted thereon in line with the bore of the container the matrix shown at 33. The holder 32 is connected with the hydraulic cylinder 26 by columns, one of which is shown at 34. The induction coil for heating the billet container is shown at 35 being enclosed within an annular space formed by the surrounding jacket 36. From a source not shown, alternating current having a frequency of fifty (50) periods is supplied to said coil, whereby in the billet container 30 eddy currents are produced which heat the container to the desired temperature.

I claim as my invention:

1. In an extrusion press in combination with a billet container a heating coil therefor coaxial with the container bore and means for feeding to said coil alternating current of low frequency thereby producing induction currents within said container uniformly heating the inner surface thereof.

2. In an extrusion press the combination with a billet container and a jacket surrounding the same forming a closed chamber therewith, a heating coil for said container coaxial with its bore being enclosed in said chamber and means uniformly feeding to said coil alternating current of low frequency thereby producing induction currents within said container for heating the inner surface thereof.

3. In an extrusion press in combination with a billet container, a heating coil therefor coaxial with the container bore, means for feeding to said coil alternating current of low frequency thereby producing induction currents within said container for heating the inner surface thereof, and means uniformly circulating a cooling medium through said coil, the inlet and the outlet of said cooling medium having the same electric potential.

4. In an extrusion press in combination with a billet container and a jacket surrounding the same forming a closed chamber therewith, a heating coil for said container coaxial with its bore, means for feeding to said coil alternating current of low frequency thereby producing induction currents within said container uniformly heating the inner surface thereof, and means for keeping off the magnetic flux produced by said coil from said jacket.

5. In an extrusion press, in combination with a billet container, a heating coil therefor coaxial with the bore of the container and having a plurality of conductors located within the body of said container, and means for feeding to said conductors alternating current of low frequency thereby producing induction currents within said container uniformly heating its inner surface.

6. In an extrusion press, in combination with a billet container, a heating coil therefor having a plurality of conductors located within the body of said container and mounted parallel to the axis of the container bore, and means for feeding to said conductors alternating current of low frequency thereby producing induction currents within said container uniformly heating its inner surface.

7. A method for heating the billet container of an extrusion press, comprising feeding to a coil surrounding the container bore alternating current of low frequency thereby producing induction currents within the body of said container uniformly heating the inner surface thereof.

HERMANN NEHLSEN.